Sept. 5, 1939.  C. E. MARSHALL  2,171,630
SPRING CLIP
Filed May 14, 1938
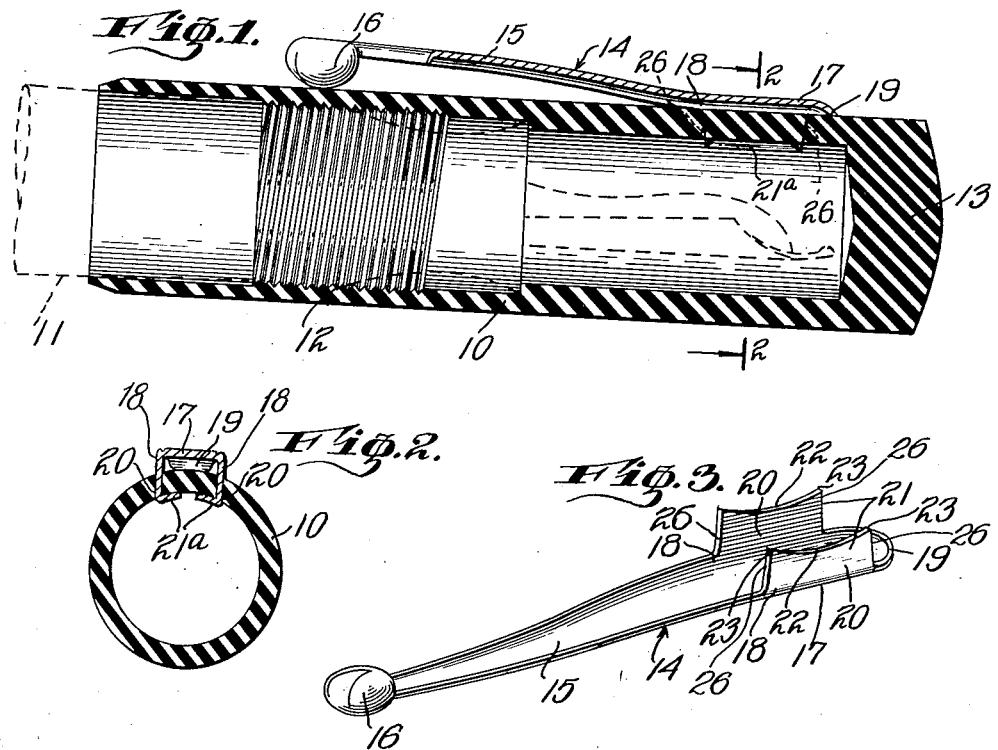
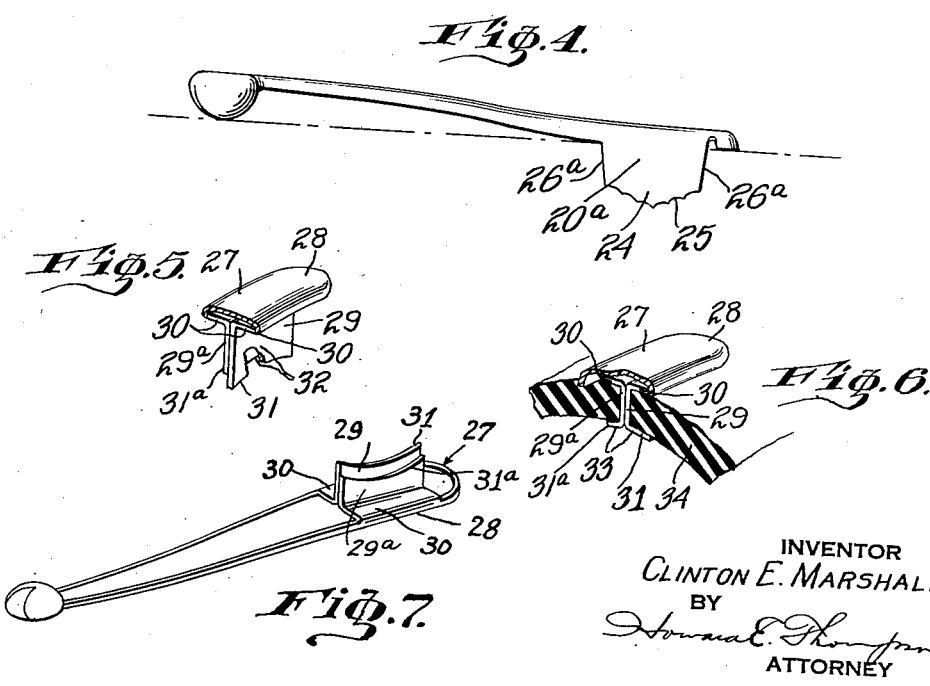
INVENTOR
CLINTON E. MARSHALL
BY
Howard E. Thompson
ATTORNEY Patented Sept. 5, 1939

2,171,630

UNITED STATES PATENT OFFICE 2,171,630

SPRING CLIP

Clinton E. Marshall, Bronx, N. Y.

Application May 14, 1938, Serial No. 207,975

5 Claims. (Cl. 24—11)

This invention relates to spring clips adapted for use in connection with various kinds and classes of articles for mounting the articles in connection with suitable supports, and particularly in supporting various writing implements such as pens and pencils; and the object of the invention is to provide a clip of the character described, the mounting end portion of which is provided with downwardly extending side flanges forming coupling members or parts for securing the clip to its support, the side members or the lower ends thereof being shaped to form one or more pronged ends, so that the clip may be forced through the wall structure of a support, when composed of certain materials, and the prongs riveted over within the wall of the support in the operation of attaching the clip thereto. The above result is accomplished without preforming or aperturing the support; a further object being to provide a clip of the character described, the body portion of which includes at the sides thereof, especially adjacent the coupling or mounting flanges, downwardly extending walls which support the body of the clip or the outer wall thereof in spaced relation to the support, while at the same time supporting the knob of the clip in tensional engagement with the supporting body; and with these and other objects in view the invention consists in a device of the character described which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a longitudinal sectional view through a fountain pen cap indicating one of my improved clips arranged thereon.

Fig. 2 is a partial section on the line 2—2 of Fig. 1.

Fig. 3 is a perspective view of the clip detached.

Fig. 4 is a side view of another form of clip which I employ.

Fig. 5 is a sectional and perspective view of another form of clip which I employ.

Fig. 6 is a view similar to Fig. 5 indicating the method of attaching the clip to a support, and Fig. 7 is a perspective view similar to Fig. 3 including the modification shown in Figs. 5 and 6.

To illustrate one method of carrying my invention into effect I have indicated in Figs. 1 and 2 of the drawing the cap 10 of a fountain pen, part of the structure, being indicated in dotted lines at 11 in Fig. 1 of the drawing. The bore of the cap is threaded as indicated at 12 to detachably couple the same with a threaded portion of the pen. The upper end of the cap is closed as seen at 13.

At 14 I have shown one of my improved clips consisting of a long spring arm 15 which may be of any desired construction and design and will have a suitable knob or projecting member 16 at one end thereof. The other or mounting end 17 of the arm is of channelled cross sectional form to provide downwardly extending side flanges 18, whereas the end of the arm is turned inwardly as seen at 19 to a degree equal to the extension of the flanges 18 so that the entire end 17 will fit snugly upon the outer wall of the cap 10 when the clip is attached in the manner later described.

The flanges 18 at the end 17 of the arm and inwardly of the inturned end 19 thereof are extended to form mounting or coupling members 20 which project a sufficient distance beyond the lower edges of the narrow flanges 18 to penetrate through the wall structure of the cap 10 so that the lower ends 21 of the members 20 may be riveted over as seen at 21a, in Fig. 2 of the drawing, in securely retaining the clip against displacement from the cap. The central portion of the lower edge of each member is concave as seen at 22 to form at the ends of each member projecting corners 23. These corners will first engage the outer surface of the cap in the operation of attaching the clip. The projecting corners 23 may be referred to or identified as spaced shearing points, and likewise the concaved portions 22 of the coupling members may be referred to as arc-shaped portions or notches.

While the cap 10 may be provided with apertures to receive the coupling members 20, with the present construction it is one of the distinctive features of my invention to provide a clip, the members 20 of which are so constructed as to facilitate attachment to the cap, without forming the apertures therein, by simply forcing the members through the material of the cap under pressure and by the use of suitable tools. In accomplishing this result a mandrel is arranged within the bore of the cap 10 to reinforce said cap and to enable it to withstand the blow or pressure exerted upon the end 17 of the clip in attaching it to the cap. In this connection it will be understood that as the lower ends pass into the bore of the cap, the ends will be flared or riveted over as indicated at 21a. In this connection it will be understood that the mandrel may be shaped to guide the bent ends 21a of the members 20.

In some instances it may be found desirable to prick-punch the outer surface of the cap to form at least four impressions to guide the operator in locating and alining the placement of the cap or the pointed ends 23 thereof on the cap. On the other hand tools or fixtures may be used which will properly guide and locate the clip on the cap and support the members 20 in the operation of forcing the same through the cap. The members may stamp slugs from the cap in forming the apertures therein for the members 20.

It will of course be understood that my invention is not necessarily limited to the particular form of coupling members 20 shown in Figs. 1 to 3 inclusive. With this thought in mind I have illustrated in Fig. 4 of the drawing another form of clip which differs from the structure shown in Figs. 1 to 3 inclusive, in providing coupling members or flanges 20a, the lower ends 24 of which have diverging and scalloped edges 25 comprising arc-shaped portions or notches which will form a series of small prongs or shearing points which will gradually be fed into the workpiece or mounting member and will ultimately produce a result similar to that shown in the other figures. It will be understood that the end portions 24 will be flared or riveted over in the same manner as is taught in Fig. 2 of the drawing.

In Figs. 1 to 3 inclusive it will appear that the front and rear edges 26 of the members 20 are arranged in a converging relationship to each other as will clearly appear upon a consideration of Fig. 1 of the drawing. The corresponding edges 26a of the members 20a are similarly formed. With this construction a firm mounting of the clip in connection with the support is assured and a mounting which will prevent longitudinal movement of the clip with respect to the support. In other words the members 20, 20a may be said to be tapered members which fit in tapered sockets of the support, and the lower edges of both of the members 20, 20a are shaped to produce what might be termed a shearing or punching operation in forcing the clip or the members 20, 20a thereof through the wall structure of the cap.

In Figs. 5 to 7 of the drawing I have shown another form of construction wherein the mounting portion of the clip is shown at 27. Instead of having the coupling members or flanges extending downwardly from side edges of the upper wall 28 of the clip, as with the structure shown in Figs. 1 to 4, these flanges or members 29, 29a are bent inwardly upon the inner surface of the top wall 28 as seen at 30 so as to bring the flanges 29, 29a together centrally of and beneath the wall 28 to form what might be termed a single prong of said members. It is also preferred that the member 29 be made slightly longer than the member 29a so that its lower portion 31 projects below the corresponding portion 31a of the member 29a.

The free edges may be concave centrally as seen at 32 forming arc-shaped portions or notches between spaced shearing points to provide the shearing effect as with the structure shown in Figs. 1 to 3 inclusive, or any other type of shearing edge may be provided so that the same punching or shearing operation takes place in mounting the clip as shown in Figs. 5 to 7 as with the members 20 in Figs. 1 to 3 and with the members 20a of Fig. 4. It will also be noted that the end portions 31, 31a of the members 29, 29a are so formed as to arrange the adjacent surfaces of the members 29, 29a flatly one upon the other, thus producing the single-prong effect.

By forming one of the members, for example the member 29, longer than the member 29a, the operation of riveting or flaring the members as seen at 33 in Fig. 6 of the drawing upon the inner surface of the support 34 is facilitated.

It will be apparent that my invention as above described relates to the mounting of clips of the character described in connection with various types and kinds of plastic or other composition supports and it is not intended for use in connection with metallic supports unless the metal be of a very soft type and kind and very thin in structure.

While it is well known in the art to provide a clip of the character described with two or more coupling flanges which pass through apertures formed in a support to receive the flanges and are then riveted over or otherwise secured, the distinctive feature of my present invention resides in the provision of means on mounting or attaching flanges for clips of the kind under consideration which are so formed as to at least partially, if not wholly form the slits, apertures or recesses in the workpiece by forcing said coupling members or flanges through the material of the support in the manner described.

Having fully described my invention, what I claim as new and desire to secure by Letters Patent is:

1. A clip for a tubular support of the class described comprising an elongated body adapted to be permanently coupled with said tubular support, one end of said clip having a pair of projecting members extending from the elongated body thereof a distance greater than the wall thickness of said tubular support thereby forming of each projecting member a shank portion adapted to pass through one wall of said support, and a securing end portion integral and continuous therewith adapted to be arranged along the inner surface of said support in securing the clip thereto, the lower edge of each of said securing end portions having spaced shearing points adapted to forcibly pierce the wall of said support in attaching the clip thereto, and the side edges of said projecting members converging toward the securing ends thereof providing thereby a wedge-like engagement of the shank portions of said members with the wall of said support.

2. A clip for a tubular support of the class described comprising an elongated body adapted to be permanently coupled with said tubular support, one end of said clip having a pair of projecting members extending from the elongated body thereof a distance greater than the wall thickness of said tubular support thereby forming of each projecting member a shank portion adapted to pass through one wall of said support, and a securing end portion integral and continuous therewith adapted to be arranged along the inner surface of said support in securing the clip thereto, said securing end portions having at the edges thereof spaced shearing points with arc-shaped portions therebetween, and the edge contour of said securing end portions forming means whereby the wall of said support may be pierced to form shank receiving apertures in the operation of mounting the clip on said support.

3. A clip for a tubular support of the class described comprising an elongated body adapted to be permanently coupled with said tubular support, one end of said clip having a pair of projecting members extending from the elongated body thereof a distance greater than the wall thickness of said tubular support thereby forming of each projecting member a shank portion adapted to pass through one wall of said support, and a securing end portion integral and continuous therewith adapted to be arranged along the inner surface of said support in securing the clip thereto, said securing end portion having at the edge thereof a plurality of spaced shearing points with arc-shaped notches therebetween, and said shearing points and notches forming means for forcibly piercing the wall of said support and removing an elongated portion thereof to form an aperture for the shank portion of said projecting member.

4. A clip for a tubular support of the class described comprising an elongated body adapted to be permanently coupled with said tubular support, one end of said clip having a pair of projecting members extending from the elongated body thereof a distance greater than the wall thickness of said tubular support thereby forming of each projecting member a shank portion adapted to pass through one wall of said support, and a securing end portion integral and continuous therewith adapted to be arranged along the inner surface of said support in securing the clip thereto, the lower edge of each securing end portion having spaced shearing points with arc-shaped notches therebetween adapting said securing end portion to forcibly penetrate the wall of said support in attaching the clip thereto, and said projecting members extending inwardly from the side edges of said clip and downwardly from the central portion thereof in abutting relationship.

5. A clip for a tubular support of the class described comprising an elongated body adapted to be permanently coupled with said tubular support, one end of said clip having a pair of projecting members extending from the elongated body thereof a distance greater than the wall thickness of said tubular support thereby forming of each projecting member a shank portion adapted to pass through one wall of said support, and a securing end portion integral and continuos therewith adapted to be arranged along the inner surface of said support in securing the clip thereto, the lower edge of each securing end portion having shearing means adapted to forcibly pierce and penetrate the wall of said support in attaching the clip thereto, said projecting members extending inwardly from the side edges of said clip and downwardly from the central portion thereof in abutting relationship, and one of said projecting members being longer than the other thereby facilitating the mounting of the clip on said support by permitting the penetration of the wall thereof by first one projecting member and then the other.

CLINTON E. MARSHALL.